L. BEDNAR.
COMBINED AUTOMOBILE WHEEL BUMPER AND WHEEL LOCK.
APPLICATION FILED NOV. 2, 1921.
1,432,657.
Patented Oct. 17, 1922.
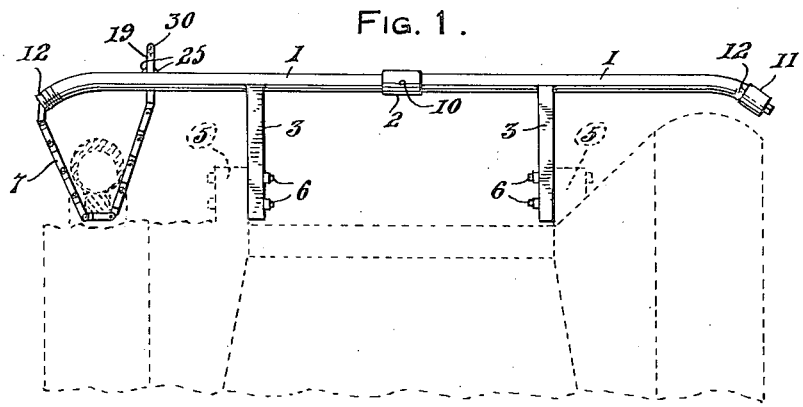
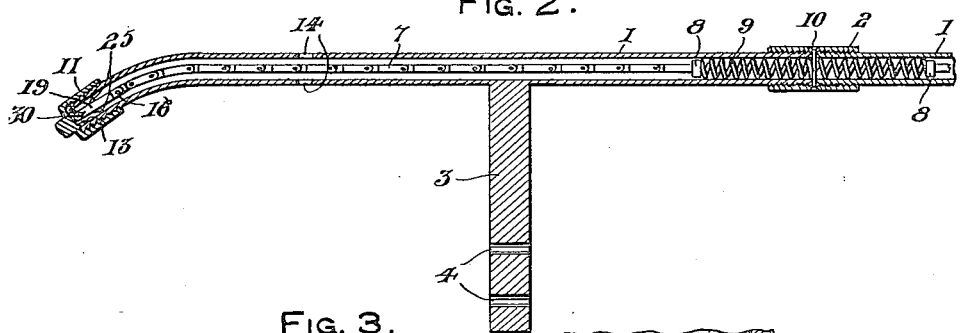
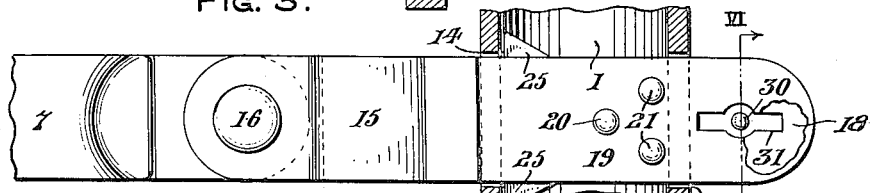
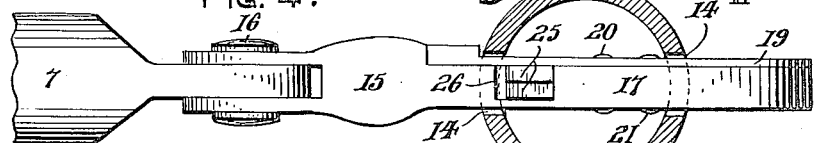
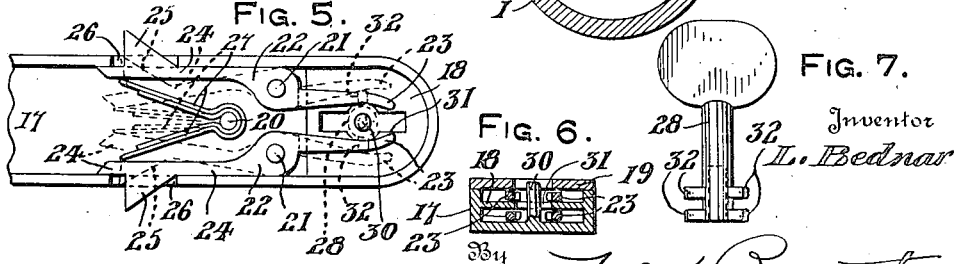
Inventor
L. Bednar
By F. R. Bryant
Attorney Patented Oct. 17, 1922.

1,432,657

UNITED STATES PATENT OFFICE.

LOUIS BEDNAR, OF WESTVILLE, ILLINOIS.

COMBINED AUTOMOBILE WHEEL BUMPER AND WHEEL LOCK.

Application filed November 2, 1921. Serial No. 512,284.

*To all whom it may concern:*

Be it known that I, LOUIS BEDNAR, a citizen of the United States of America, residing at Westville, in the county of Vermilion and State of Illinois, have invented certain new and useful Improvements in Combined Automobile Wheel Bumpers and Wheel Locks, of which the following is a specification.

This invention relates to new and useful improvements in combined automobile bumper and wheel lock, and has particular reference to a chain or flexible member housed within a hollow bumper and adapted to be extended from one end of the bumper for encircling the front wheel of an automobile with the free end of the chain or flexible member secured to the bumper.

The primary object of the invention embodies a novel form of lock carried by the free end of the wheel-anchoring chain, while the bumper supporting the chain is constructed for cooperation with the lock to anchor the wheel against movement.

This application is a continuation in so far as shown and described of the construction disclosed in my prior application filed September 22, 1921, Serial No. 502,448, and embodies improvements in the lock device for the anchoring chain.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application, and in which like designating characters refer to corresponding parts throughout the several views, Figure 1 is a top plan view of a combined automobile bumper and wheel lock constructed in accordance with the present invention, one of the wheel locks being projected from the bumper and enclosing a wheel and tire illustrated by dotted lines, Figure 2 is a fragmentary sectional view of the bumper and wheel lock, Figure 3 is a fragmentary top plan view of the end of the wheel locking chain having the key-operating lock opening end thereof inserted in the tubular bumper shown in section, Figure 4 is a side elevational view of the chain lock shown in Fig. 3, with the bumper shown in section, the chain lock being confined in the bumper, Figure 5 is a top plan view of the chain lock with the cover removed to show the latch levers of the lock, Figure 6 is a detail sectional view taken on line VI—VI of Fig. 3, showing the key-receiving pin and levers and arms of the latch levers and Figure 7 is a side elevational view of the key employed for releasing the lock.

In the accompanying drawing there is illustrated an automobile bumper formed of sections 1 having their adjacent ends threaded and connected by a coupling sleeve 2, a bracket 3 having bolt-receiving openings 4 therein being supported on the chassis 5 of the automobile illustrated by dotted lines in Fig. 1, and retained in position by the bolts 6.

A wheel-anchoring member in the form of a flexible device or chain embodying link sections 7 is housed within each section 1 of the bumper, the inner end of each chain having a plunger head 8 engaged by the coil spring 9 positioned in the adjacent ends of the bumper sections and anchored by the cross pin 10. The chain is confined within the bumper by the screw cap 11 mounted on the threaded end 12 of the bumper while complete removal of the chain from the bumper is prevented by the plunger head 8 engaging the inwardly directed shoulder 13 carried by the outer end of the bumper as shown in Fig. 2.

When the chain is extended from the bottom section 1, the same encircles the wheel of an automobile, as shown in Fig. 1, the outer end of the bumper shown passing through diametrically opposite slotted openings 14 in the adjacent bumper section and anchored therein by the latch device carried by the end of the bumper chain. The latch device is shown more clearly in Figs. 3 to 6, wherein the end link 15 is pivoted as at 16 to the adjacent link of the chain 7, the link 15 being provided with a seat portion 17 and a transverse horizontal partition 18 adjacent the outer end while a removable cover 19 is retained in position by the pins 20 and 21 connecting the cover to the bottom wall of the link 15. Latch levers 22 arranged in superposed pairs are pivotally mounted upon the pins 21 and have the rearwardly directed arms 23 lying above and below the partition 18, the legs 24 of the levers carrying beveled latch heads 25 adapted to be projected through side openings 26 in the side wall of the link 15 as clearly shown in Fig. 5. To force the latch lever legs 24 outwardly to project the latch heads 25, through the side 26 a pair of V-shaped springs 27 is supported on the pin 20 with the outer free ends thereof engaging the inner sides of the latch lever legs 24. To cause the legs 24 to be moved inwardly of the link and against the tension of the springs 27, the key 28 shown in Fig. 7, having a terminal socket 29 is received on the pin 30 projecting perpendicularly from the bottom wall of the link 15 and through the key-slot 31 in the partition 18, the shank of the key carrying oppositely directed lugs 32 for engaging the latch lever arms 23 above and below the partition 18, the key lugs 32 engaging the latch lever arms 23 to move the latch levers upon the pivots 21 and to withdraw the latch heads 25 inwardly of the side link openings 26.

With the chain 7 enclosing the wheel of the automobile, the link 15 is inserted through the diametrically opposite openings 14 of the adjacent bumper section 1, causing the latch heads 25 to ride over the opposite side walls of the bumper opening 14 and to assume the position shown in Fig. 3, when said latch heads are positioned inwardly of the bumper, thereby anchoring the link 15 of the locking chain to the bumper. In releasing the lock connection between the chain and the bumper the key 28 is employed for shifting the latch levers 22 to move the same inwardly of the link 15 and permit movement of the link 15 outwardly of the bumper, at which time the key is removed and the latch heads 25 riding over the side walls of the bumper opening 14 will permit the withdrawal of the link 15 from the bumper section 1. When the locking chain is disengaged from the bumper, the same is restored to a housed position within the bumper section and the screw cap 11 mounted upon the threaded end 12 of the bumper for confining the locking chain within the bumper. As the levers 22 are arranged in pairs with the arms of the levers arranged respectively above and below the partition 18 it is necessary to provide a special type of key for releasing the latch levers, thus adding to the effectiveness of the lock to prevent unauthorized use of an automobile.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim is:—

1. In combination with the front wheels and bumper of a motor vehicle, a lock including a flexible member positioned within the bumper, said flexible member adapted to be withdrawn from the bumper and positioned around a wheel of a vehicle, and a plurality of latch levers carried by the flexible member for locking the flexible member to the bumper.

2. In combination with the front wheels and bumper of a motor vehicle, a lock including a flexible member positioned within the bumper, said flexible member adapted to be withdrawn from the bumper and positioned around a wheel of a vehicle, and a latch lever carried by one end of the flexible member for locking the flexible member to the bumper.

3. In a locking device, a hollow member, a flexible member confined therein, and adapted to be partially projected therefrom, said hollow member having transverse openings therein and adapted to receive the outer end of the flexible member and means carried by the outer end of the flexible member for anchoring the same in the hollow member.

4. In a locking device, a hollow member, a flexible member confined therein, and adapted to be partially projected therefrom, said hollow member having transverse openings therein and adapted to receive the outer end of the flexible member, and tensioned latch members carried by the outer end of the flexible member for anchoring the same in the hollow member.

5. In a locking device, a hollow member, a flexible member confined therein, and adapted to be partially projected therefrom, said hollow member having transverse openings therein and adapted to receive the outer end of the flexible member, tensioned latch levers carried by the outer end of the flexible member for anchoring the same in the hollow member, and means for releasing the latch levers to permit withdrawal of the end of the flexible member from the hollow member.

In testimony whereof I affix my signature.

LOUIS BEDNAR.